April 15, 1952     R. COLOMBO     2,592,658
EXTRUSION HEAD FOR MOLDING SYNTHETIC RESINS
Filed Feb. 21, 1948

INVENTOR.
ROBERTO COLOMBO
BY
Haseltine, Lake & Co.
AGENTS.

Patented Apr. 15, 1952

2,592,658

UNITED STATES PATENT OFFICE 2,592,658

EXTRUSION HEAD FOR MOLDING SYNTHETIC RESINS

Roberto Colombo, Turin, Italy

Application February 21, 1948, Serial No. 10,155
In Italy August 20, 1943

Section 1, Public Law 690, August 8, 1946
Patent expires August 20, 1963

2 Claims. (Cl. 18—12)

Processes have already been proposed for the continuous manufacture by extrusion of articles composed of synthetic materials differing in physical and chemical properties.

According to the known processes, the different materials are extruded through a nozzle corresponding in cross sectional area to the desired article, the different ingredients being supplied separately by individual presses, so that, on issuing from the said presses, their cross section and position are the same as they should be in the final product.

These processes are unsuitable for extruding thermoplastic materials, inasmuch as the nozzles for extruding more particularly viscous materials such as thermoplasts exactly match in form the desired article in their end portion only, while the preceding portion is of a different cross section.

This invention relates to an apparatus for manufacturing by one operation pipes formed by two superposed layers of thermoplastic material of different properties and colors, wherein the material forming the outer portion of the finished pipe is extruded in such manner as to fill initially the whole cross section of the extrusion nozzle, and the material forming the inner layer of the finished pipe is injected ahead of the extrusion opening so that the previously extruded material is subjected to a lateral compression which affords a satisfactory adhesion of the two layers of thermoplast and an improved compactness of the finished pipe, eliminating any possibility of interpenetration of the two thermoplastic materials at their contact surface.

Figure 1:
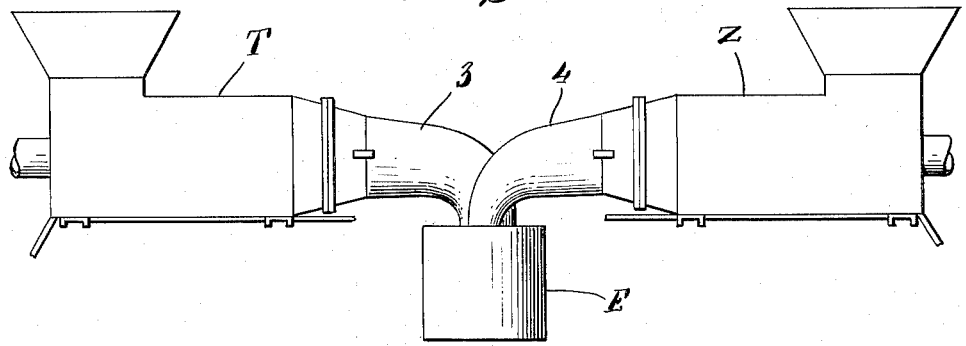
Figure 2:
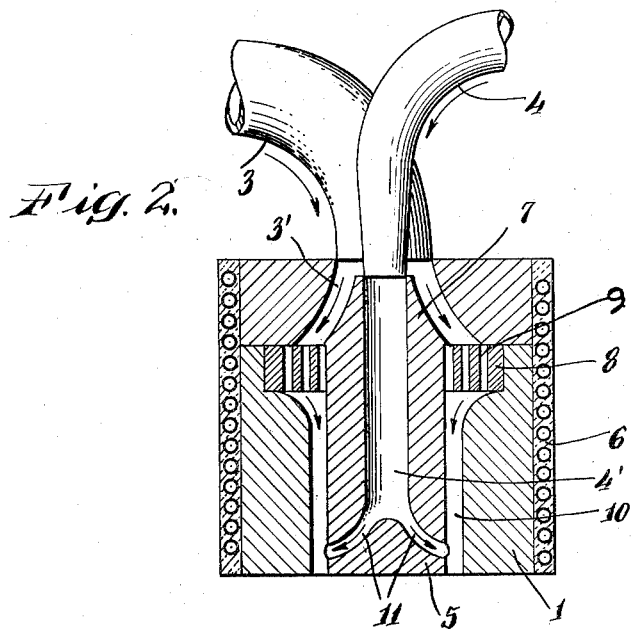
Figure 3:
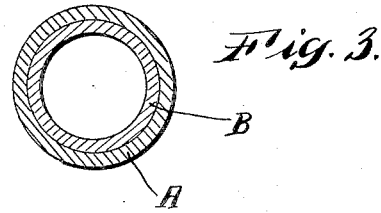

Fig. 1 is a diagrammatic view of the apparatus comprising an extrusion head and the two feeding presses. Fig. 2 is an axial section of the extrusion head for manufacturing tubes, such as shown in section in Fig. 3, having an outer portion differing in colour or physical or chemical properties from the inner portion. Fig. 3 is a cross-section through a finished tube.

Referring to Fig. 1, the apparatus comprises two separate extrusion presses T and Z feeding the extrusion head E through conduits 3 and 4. Fig. 2 is an axial section of the extrusion head E which comprises a casing 1 suitably provided with heating means 6 and bored axially. A core 7 and a flange 8 having holes 9 bored therein are placed in the axial bore. A top clearance 3' is formed between the core 7 and casing 1 and merges into the conduit 3, ending below by the drawing die 5. An axial conduit 4' is bored in the core 7 and merges above into the conduit 4, ending below by radial conduits 11 opening into the clearance 10 near the drawing-die 5.

The conduit 3 is connected with an extrusion press T which feeds material of a given colour or physical chemical properties, and the conduit 4 is connected with an extrusion press Z feeding material of other colour or properties.

This results in a tube shown in cross-section in Fig. 3 having an inner layer B and an outer layer A of materials of different chemical and physical properties. The tube may further be formed with inner and outer projections.

By cutting the tube along one of the generatrices and flattening it on a surface, a sheet will be obtained even of large size according to the diameter of the tube formed.

What I claim is:

1. Extrusion head for pipes having two superposed layers of thermoplastic materials differing in properties or colors, comprising in combination an outer body bored along an axis and ending in an extrusion die, the inner surface of said bore limiting the outer surface of the finished pipe, means for heating said outer body, a fixed core coaxial with said outer body and ending at the extrusion die, the cross section of the chamber between the inner core and surface of the bore in the outer body constantly equalling the cross section of the extruded pipe, said fixed core being bored in the part remote from the extrusion die, said last mentioned bore communicating with the previously mentioned chamber through channels nearly perpendicular to the axis of the core, and situated near the end of said core toward the extrusion die, a press for feeding the thermoplastic material to said chamber at the remote end of the extrusion die, so that a pipe of homogeneous material is formed ahead of the previously mentioned channels, a second press communicating with the bore in the inner core and adapted to feed a second thermoplastic material to the chamber between the outer body and inner core, said last mentioned press extruding the thermoplastic material, so that the finished two-layer pipe equals in cross section the previously extruded pipe.

2. Extrusion head for pipes having two superposed layers of thermoplastic materials differing in properties or colors, comprising in combination an outer body bored along an axis and ending in an extrusion die, the inner surface of said body limiting the outer surface of the finished pipe, means for heating said outer body, a fixed core coaxial with said outer body and ending at the extrusion die, the cross section of the chamber between the inner core and surface of the bore in the outer body constantly equalling the cross section of the extruded pipe, said chamber being limited at the end opposite the extrusion die for the pipe by a bored diaphragm perpendicular to the axis of the inner core, said fixed core being bored in the part remote from the extrusion die, said last mentioned bore communicating with the previously mentioned chamber through channels nearly perpendicular to the axis of the core and situated near the end of said core toward the extrusion die, a press for feeding the thermoplastic material to said chamber at the remote end of the extrusion die, so that a pipe of homogeneous material is formed ahead of the previously mentioned channels, the bores in said previously mentioned diaphragm serving for extrusion nozzles for the material extruded by said press, a second press communicating with the bore in the inner core and adapted to feed a second thermoplastic material to the chamber between the outer body and inner core, said last mentioned press extruding the thermoplastic material, so that the finished two-layer pipe equals in cross section the previously extruded pipe.

ROBERTO COLOMBO.

REFERENCES CITED

The following references are of record in the file of this patent:

UNITED STATES PATENTS

| Number | Name | Date |
| --- | --- | --- |
| 37,112 | Sault | Dec. 9, 1862 |
| 876,755 | Webb | Jan. 14, 1908 |
| 1,595,470 | Johnson | Aug. 10, 1926 |
| 1,637,207 | Whitehouse | July 26, 1927 |
| 1,933,212 | Gora | Oct. 31, 1933 |
| 1,952,469 | Snyder et al. | Mar. 27, 1934 |
| 2,057,467 | Williams | Oct. 13, 1936 |
| 2,096,362 | Lehman | Oct. 19, 1937 |
| 2,174,779 | Delorme | Oct. 3, 1939 |
| 2,389,084 | Routh | Nov. 13, 1945 |

FOREIGN PATENTS

| Number | Country | Date |
| --- | --- | --- |
| 535,311 | Great Britain | Apr. 4, 1941 |